United States Patent
Tsai et al.

(10) Patent No.: US 6,484,626 B1
(45) Date of Patent: Nov. 26, 2002

(54) EXTRACTING DEVICE FOR HERB OR THE LIKE

(76) Inventors: Wu Chin Tsai, 3F, No. 171, Huang Hsin Road, San Min Chu, Kaoshiung (TW), 807; Min Tan Yu, 3F-1, No. 65, Da Chang 2nd Road, San Min Chu, Kaoshiung (TW), 807

( * ) Notice: Subject to any disclaimer, the term of this patent is extended or adjusted under 35 U.S.C. 154(b) by 290 days.

(21) Appl. No.: 09/659,051

(22) Filed: Sep. 11, 2000

(51) Int. Cl.[7] .............................. A23L 1/00; A23N 1/00; F26B 3/00; F26B 21/02; B01D 3/00
(52) U.S. Cl. .............................. 99/495; 99/279; 99/417; 99/516
(58) Field of Search .......................... 99/279, 285, 287, 99/297, 495, 516, 517, 511–513, 416, 417; 422/124, 125, 306, 307, 228, 269, 227, 276; 202/168–170, 185.1, 185.3; 203/49, 91, 98, 100; 62/3.2; 127/34; 210/651, 767, 338, 405, 418, 446, 449; 435/816; 34/77, 78, 22, 92, 219, 370, 372; 165/65, 104, 22, 110, 185.1, 185.3; 426/640, 465, 520, 429–431

(56) References Cited

U.S. PATENT DOCUMENTS

| | | | |
|---|---|---|---|
| 4,419,238 A | * 12/1983 | Shaw | 210/499 X |
| 4,490,335 A | * 12/1984 | Marev et al. | 422/269 |
| 4,640,186 A | * 2/1987 | Hackelsberger | 99/495 |
| 4,776,104 A | * 10/1988 | Kuoyama | 34/77 |
| 5,031,522 A | * 7/1991 | Brixel et al. | 99/516 X |
| 5,113,597 A | * 5/1992 | Sylla | 34/22 |
| 5,372,680 A | * 12/1994 | Bezdolny et al. | 202/83 |
| 5,458,895 A | * 10/1995 | Petronini et al. | 99/495 X |
| 5,572,923 A | * 11/1996 | Kuboyama | 99/295 X |
| 5,993,748 A | * 11/1999 | Wheeler | 422/125 |
| 5,996,247 A | * 12/1999 | Kuboyama | 34/370 |
| 6,001,221 A | * 12/1999 | Koboyama | 202/168 |
| 6,398,919 B1 | * 6/2002 | Kuboyama | 203/49 |

* cited by examiner

Primary Examiner—Timothy F. Simone
(74) Attorney, Agent, or Firm—Charles E. Baxley

(57) ABSTRACT

An extracting device includes a housing for receiving a material to be extracted and to be heated into steam. An upper casing is disposed in the upper portion of the housing and has one or more steam flowing orifices. A box is disposed in the lower portion of the housing and coupled to the casing. A container is disposed above the casing, and a lower casing is attached to the bottom of the upper casing and coupled to the container. The steam may flow through the casings and the container and the box without heat loss.

11 Claims, 6 Drawing Sheets

EXTRACTING DEVICE FOR HERB OR THE LIKE

BACKGROUND OF THE INVENTION

1. Field of the Invention

The present invention relates to an extracting device, and more particularly to an extracting device for effectively extracting the nutrient, the medicine or the like from herb, tree leaves, tree branches, tree barks, fruit, vegetable, etc.

2. Description of the Prior Art

Typical extracting facilities are provided for extracting nutrient, medicine or the like from herb, tree leaves, tree branches, tree barks, fruits, vegetable, etc., and comprise a number of containers disposed in series and coupled together in series with coupler pipings. The herb, the tree leaves, the tree branches, the tree barks, the vegetable or the fruits are disposed in the front-most or in some of the containers and will be heated or steamed to extract the substances or the nutrient or the medicine from the materials. The steam may flow from one container to the others for carrying the nutrient, the medicine or the like out of the containers. The heat of the steam may loss when flowing through the coupler pipings and the containers, such that much more energy is required to be consumed to heat and to vaporize the materials.

The present invention has arisen to mitigate and/or obviate the afore-described disadvantages of the conventional extracting devices.

SUMMARY OF THE INVENTION

The primary objective of the present invention is to provide an extracting device for effectively extracting the nutrient, the medicine or the like from herb, tree leaves, tree branches, tree barks, fruit, vegetable, etc.

The other objective of the present invention is to provide an extracting device for effectively extracting the nutrient, the medicine or the like without heat loss.

In accordance with one aspect of the invention, there is provided an extracting device comprising a housing for receiving a material to be extracted and to be heated into steam, the housing including an upper portion and a lower portion, a first casing disposed in the upper portion of the housing, the first casing including at least one orifice formed therein for allowing the steam to flow into the first casing, a box disposed in the lower portion of the housing, and at least one tube coupled between the first casing and the box for allowing the steam in the first casing to flow into the box before the steam flows out of the housing. The steam in the box may further be heated by the heating device that is normally provided below the housing.

The box includes at least one partition provided therein for forming a roundabout route therein and for increasing the flowing passage of the steam. The partition is circular and includes at least one opening formed therein for forming the roundabout route.

A container is further disposed on top of the first casing, and at least one pipe couples the box to the container for allowing the steam to flow from the box to the container. A spring-biasing member is disposed and biased between the container and the first casing.

A second casing is received in the housing and disposed below the first casing, at least one duct is coupled between the second casing and the container for allowing the steam to flow from the container to the second casing.

A plate is disposed between the first casing and the second casing, the plate and the second casing each includes at least one orifice formed therein for allowing the steam to flow through the plate and the second casing.

The second casing includes a first board provided therein for forming a first chamber and a second chamber in the second casing, the first board includes at least one aperture formed therein for communicating the first chamber and the second chamber of the second casing with each other, the duct includes a lower portion engaged into the first chamber of the second casing via the first board and includes an upper portion engaged into the container for allowing the steam in the container to flow into the first chamber of the second casing.

The housing includes a cover secured on top thereof and having a coupler provided thereon, and at least one conduit having a lower end engaged into the second chamber of the second casing and having an upper portion coupled to the coupler.

The second casing includes a second board secured therein and located below the first board for forming the first chamber between the first and the second boards, the second board includes a cap attached thereto. The box includes a bottom portion having a lid attached thereto.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
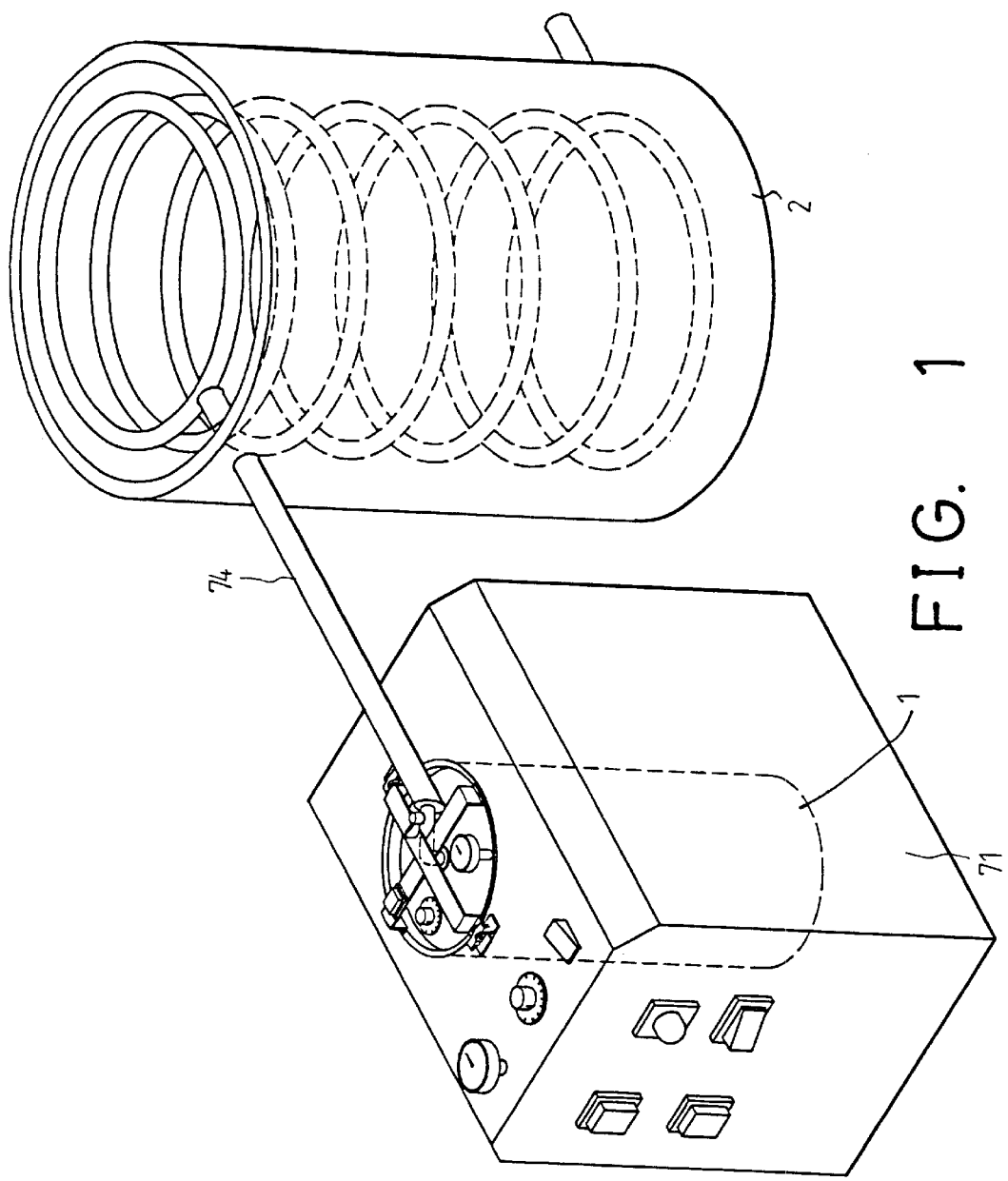
FIG. 1 is a perspective view of an extracting facility having an extracting device in accordance with the present invention.
Figure 2:
FIG. 2 is a partial perspective view illustrating a fastening device for securing the extracting device to the receptacle of the extracting facility.
Figure 3:
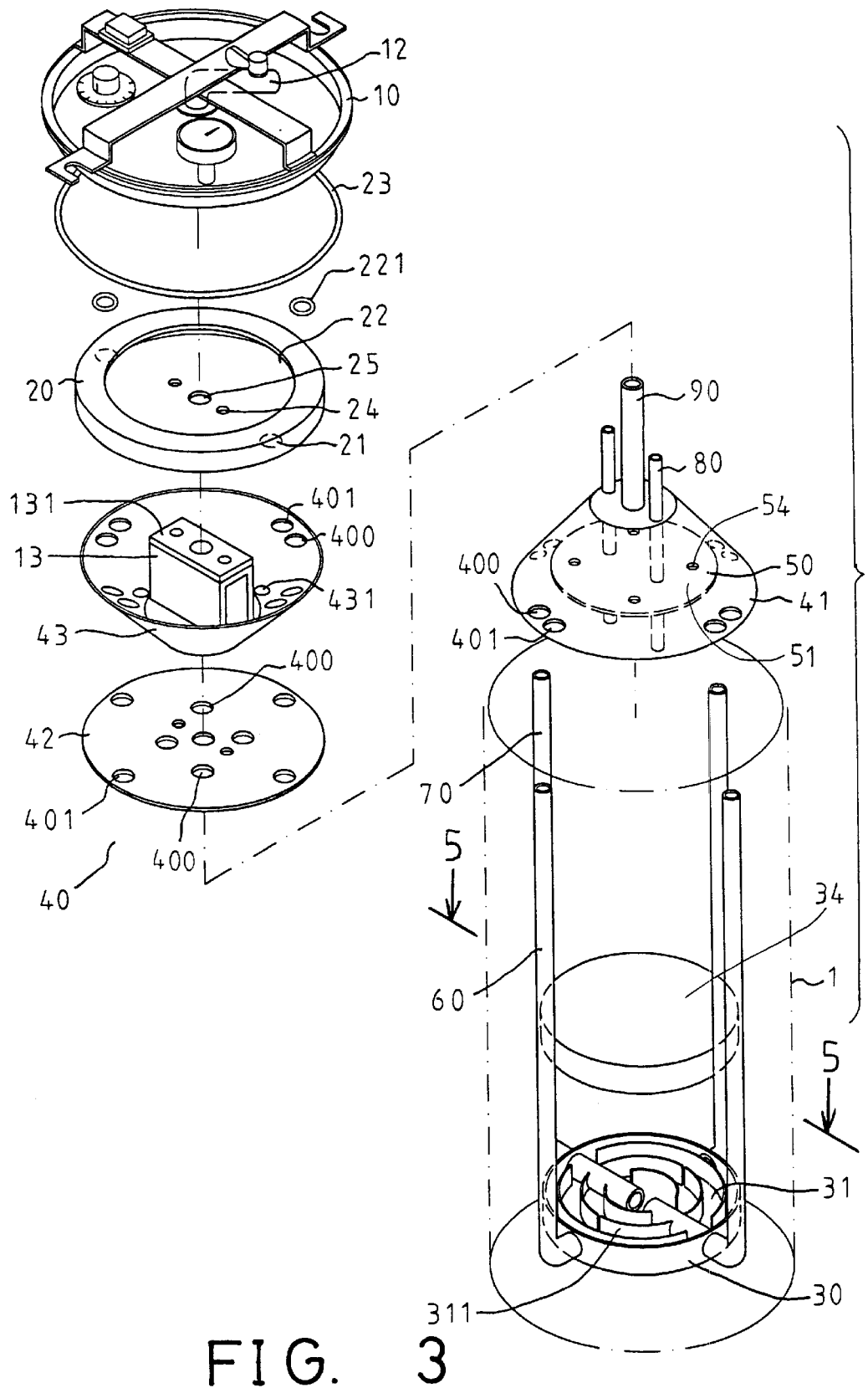
FIG. 3 is an exploded view of the extracting device.
Figure 4:
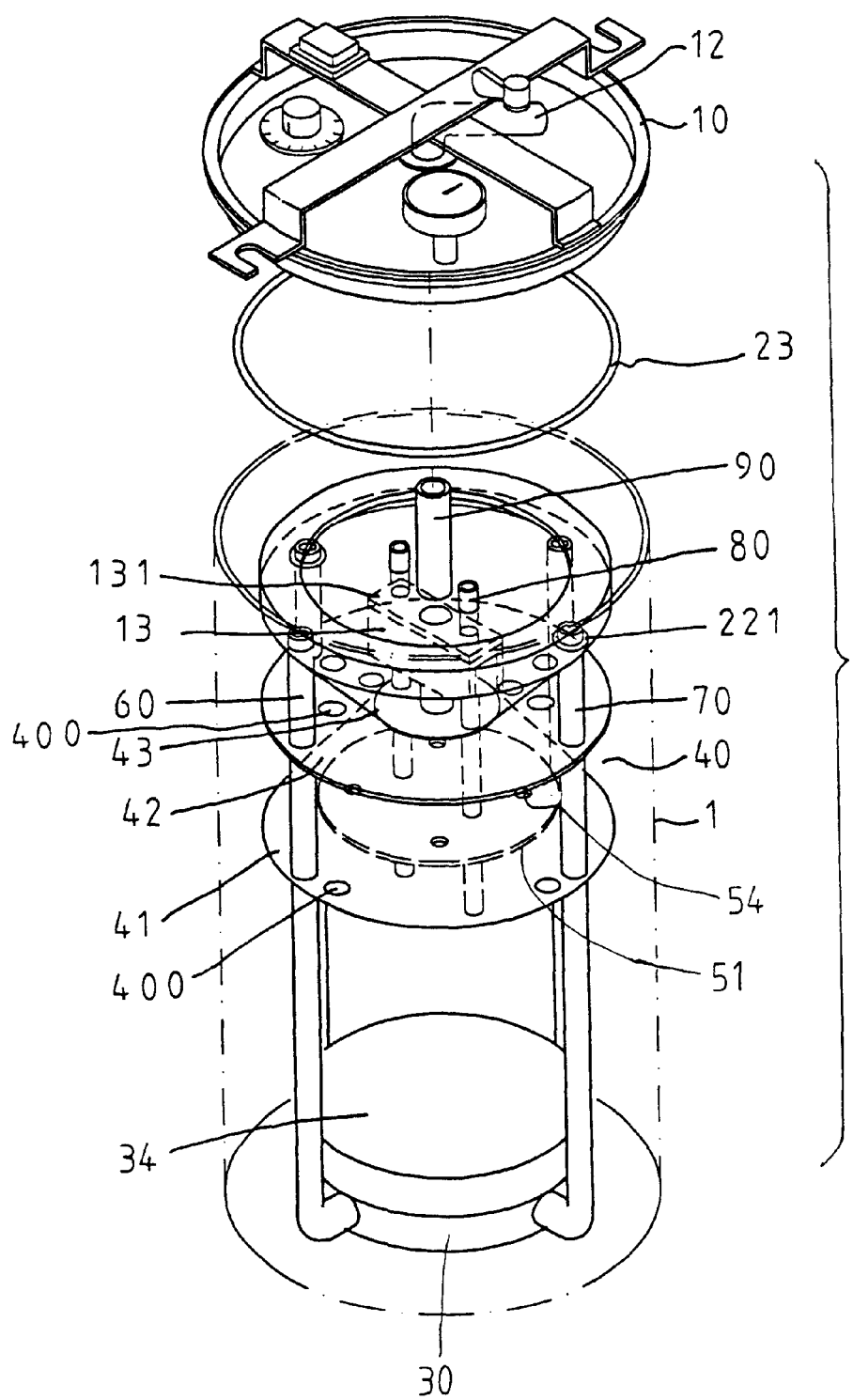
FIG. 4 is a partial exploded view of the extracting device.
Figure 5:
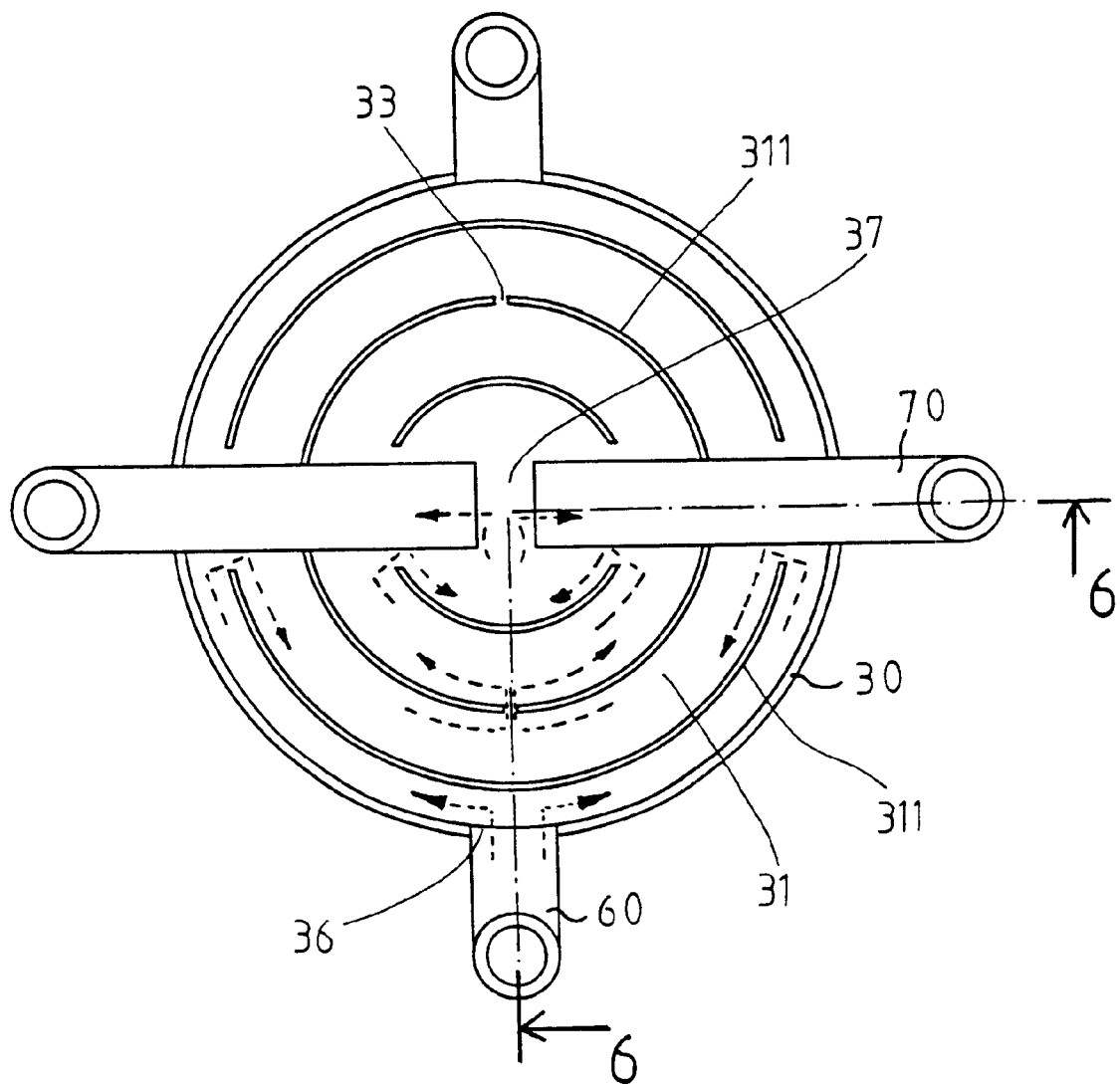
FIG. 5 is a cross sectional view taken along lines 5—5 of FIG. 3.

Referring to the drawings, and initially to FIGS. 1–4, an extracting device in accordance with the present invention comprises a housing 1 disposed in a receptacle 71 of a heating device of an extracting facility for receiving the materials 3 to be extracted (FIG. 7), such as the herb, the tree leaves, the tree branches, the tree barks, the vegetable and/or the fruits and for allowing the materials to be heated by the heating device. The heating device may be any suitable heating device and is not related to the present invention and thus will not be described in further details. The housing 1 includes a cover 10 disposed on top thereof and secured to the receptacle 71 with one or more fasteners 73 (FIG. 2). A coupler 12 is coupled to an outlet 11 of the cover 10 (FIGS. 6, 7) of the housing 1 and is coupled to such as a cooling device 2 via a hose 74 or the like.

As best shown in FIGS. 3–6, the extracting device includes a container 20 secured in the upper portion of the housing 1 and having a chamber 22 formed therein and having a number of holes 21, 24, 25 formed in the bottom thereof and communicating with the chamber 22 thereof. A sealing ring 23 is disposed between the container 20 and the cover 10 for making a water tight seal between the container 20 and the cover 10. The chamber 22 of the container 20 may be formed as an enclosed chamber 22 when the container 20 is secured to the bottom of the cover 10.

Figure 6:
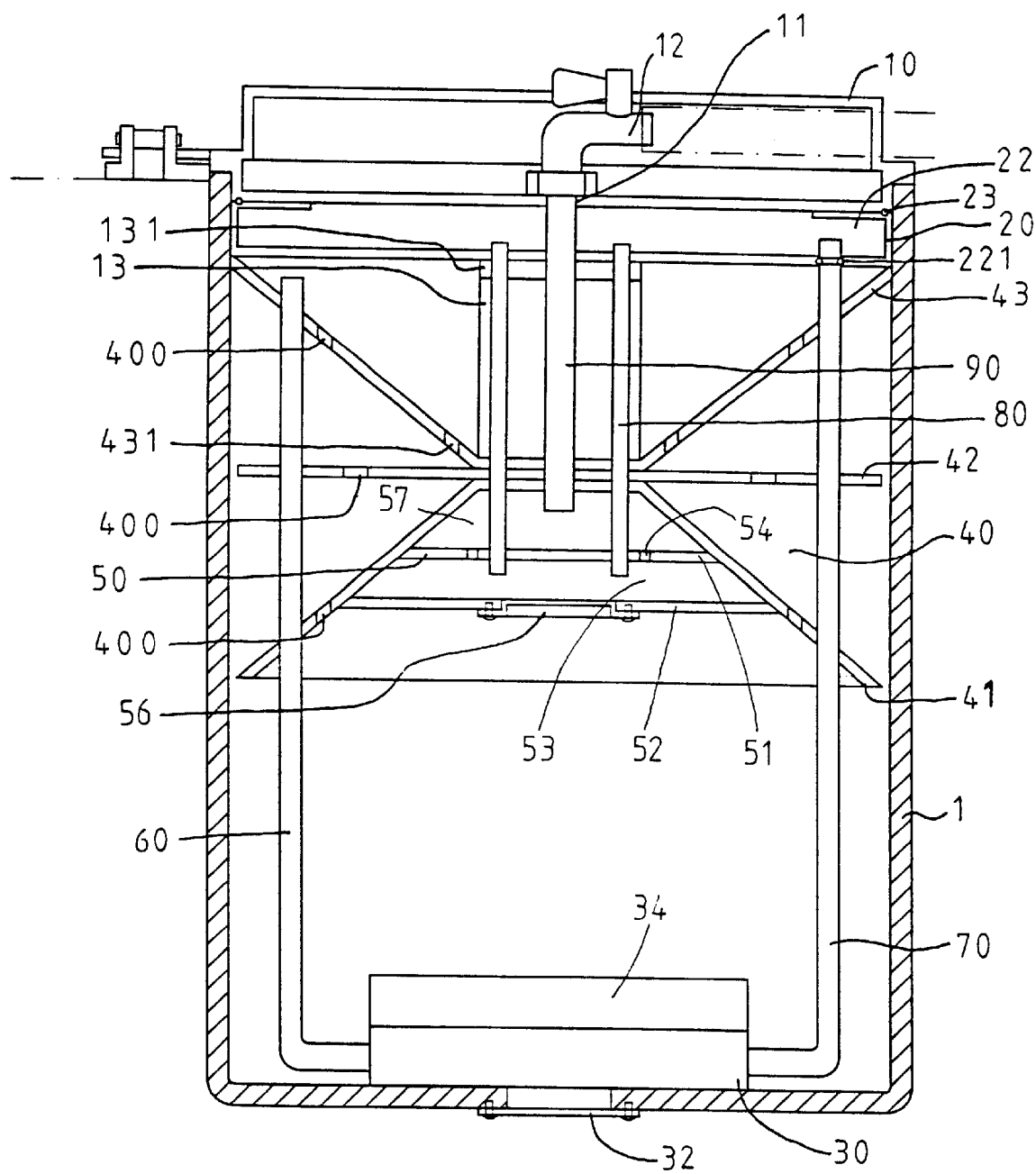
FIG. 6 is a cross sectional view taken along lines 6—6 of FIG. 5.
Figure 7:
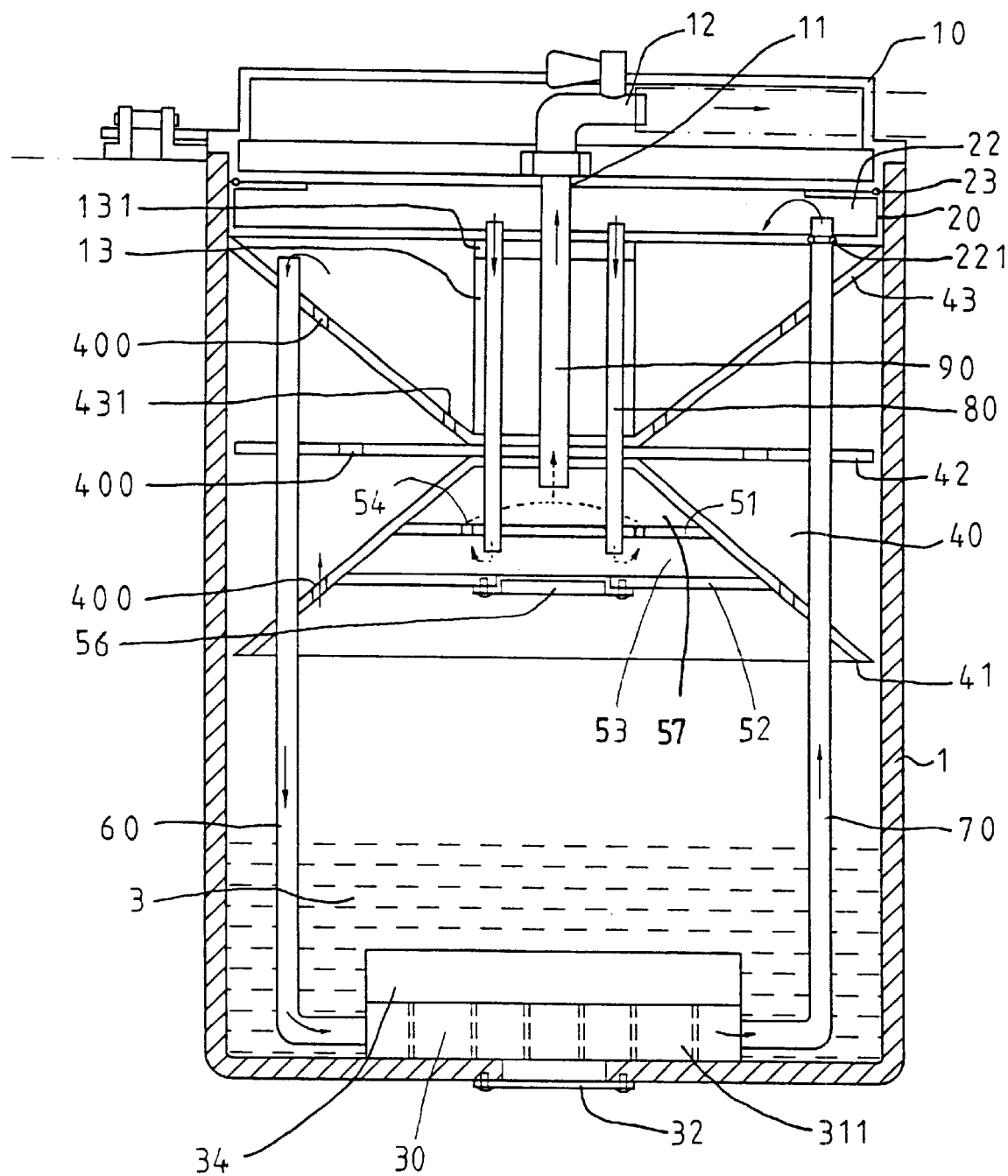
FIG. 7 is a cross sectional view similar to FIG. 6, illustrating the operation of the extracting device.

A box 30 is secured or provided in the bottom of the housing 1 and includes a roundabout route 31 formed in the box 30 by one or more curved partitions 311. One or more openings 33 are formed in the partitions 311 and off-set from each other for forming the roundabout route 31 and for increasing the length of the roundabout route 31 of the box 30. A cap 34 is secured on top of the box 30 for enclosing the roundabout route 31. One or more tubes 60 are disposed in the housing 1 and each includes a lower end coupled to an entrance 36 of the box 30 and each includes an upper end extended upward to the upper portion of the housing 1 and located below the container 20 (FIGS. 6, 7). One or more pipes 70 are disposed in the housing 1 and each includes a lower end coupled to a middle portion or an exit 37 of the box 30 and each includes an upper end extended upward into the chamber 22 of the container 20 via the holes 21 of the container 20 (FIGS. 6, 7). One or more sealing rings 221 are engaged between the container 20 and the pipes 70 for making a water or air tight-seal therebetween. A lid 32 may be provided in the bottom of the box 30.

A filter device 40 includes two frustum-shaped casings 41, 43 secured in the upper portion of the housing 1 and attached to the bottom of the container 20 and engaged on or secured to the tubes 60 and pipes 70. A plate 42 is secured between the casings 41, 43. The frustum-shaped casing 41 is faced upward, and the other frustum-shaped casing 43 is faced downward. The casings 41, 43 and the plate 42 each includes a number of holes 401 for receiving the tubes 60 and the pipes 70, and each includes one or more orifices 400, 431 formed therein for allowing the steam to flow into the casings 41, 43 and into the spaces between the casings 41, 43 and the plate 42. The casings 41, 43 and the plate 42 may be secured to the tubes 60 or the pipes 70 or secured to the housing 1 by such as the adhesive materials, or by the welding process. A resilient or spring-biasing member 13 is disposed in the casing 43 and includes a resilient or spring-biasing panel 131 disposed on top thereof for engaging with the container 20 and for resiliently clamping the container 20 between the filter device 40 and the cover 10.

An auxiliary device 50 is disposed in the casing 41 and includes one or more boards 51, 52 secured in the casing 41 for forming one or more chambers 53, 57 in the casing 41. The intermediate board 51 includes a number of apertures 54 formed therein for communicating the chambers 53, 57 with each other. The bottom one of the boards 52 includes a cap 56 attached thereto for removing the objects collected upon the bottom board 52. One or more ducts 80 are engaged through the casings 41, 43 and the plate 42, and include a lower end engaged through the bottom board 52 and engaged into the chamber 53 of the casing 41, and include an upper end engaged into the chamber 22 of the container 20 via the holes 24 of the container 20, such that the chambers 22, 53 of the container 20 and the casing 41 may be communicated with each other by the ducts 80. One or more conduits 90, though only one conduit 90 is shown in the drawings, are engaged through the casings 41, 43 and the plate 42, and include a lower end engaged into the chamber 57 of the casing 41, and include an upper end engaged through the container 20 and coupled to the coupler 12, such that the chamber 57 of the casing 41 may be directly coupled to the coupler 12 and thus to the cooling device 2 with the conduits 90.

In operation, as shown in FIG. 7, the materials 3 to be extracted, such as the herb, the tree leaves, the tree branches, the tree barks, the vegetable and/or the fruits, are received in the housing 1 and may be heated into steam by the heating device that is normally provided in the bottom or below the bottom of the housing 1. The steam of the materials 3 or containing the materials. 3 may flow upward into the casing 43 through the orifices 400, 431 of the casings 41, 43 and the plate 42. The larger particles carried by the steam may be filtered away by the filter device 40. Some of the relatively smaller particles carried into the casing 43 by the steam may be collected in the bottom of the casing 43. The steam in the casing 41 may then be forced to flow into the roundabout routes 31 of the box 30 via the tubes 60. The box 30 is located in the bottom of the housing 1 and is thus located closer to the heating device that is provided below the housing 1 such that the steam in the box 30 may further be heated or may be heated again and may then flow into the chamber 22 of the container 20 via the pipes 70. Some of the particles may further be collected on the bottom of the box 30 and may be removed via the lid 32. The steam in the container 20 then flows into the chamber 53 of the casing 41 via the ducts 80. The auxiliary device 50, particularly the boards 51, 52 of the auxiliary device 50 may be heated by the upwardly flowing steam such that the steam flowing into the chamber 53 of the casing 41 may further be heated. Some of the particles may further be collected on the board 52 and may be removed via the cap 56. The steam then flows into the chamber 57 of the casing 41 and then flows through the conduit 90 and the coupler 12 and then flows to the cooling device 2 for further treatment.

It is to be noted that the flowing passages of the steam are all located and provided in the housing I such that no heat loss may be occurred, and such that the extracting processes may be effectively operated.

Accordingly, the extracting device in accordance with the present invention may be used for effectively extracting the nutrient, the medicine or the like from herb, tree leaves, tree branches, tree barks, fruit, vegetable, etc., without heat loss.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An extracting device comprising:
    a housing for receiving a material to be extracted and to be heated into steam, said housing including an upper portion and a lower portion;
    a first casing disposed in said upper portion of said housing, said first casing including at least one orifice formed therein for allowing the steam to flow into said first casing;
    a box disposed in said lower portion of said housing; and
    at least one tube coupled between said first casing and said box for allowing the steam in said first casing to flow into said box before the steam flows out of said housing.

2. The extracting device according to claim 1, wherein said box includes at least one partition provided therein for forming a roundabout route therein.

3. The extracting device according to claim 2, wherein said at least one partition includes at least one opening formed therein.

4. The extracting device according to claim 1 further comprising a container disposed on top of said first casing, and at least one pipe coupling said box to said container for allowing the steam to flow from said box to said container.

5. The extracting device according to claim 4 further comprising a spring-biasing member disposed and biased between said container and said first casing.

6. The extracting device according to claim 4 further comprising a second casing received in said housing and disposed below said first casing, at least one duct coupled between said second casing and said container for allowing the steam to flow from said container to said second casing.

7. The extracting device according to claim 6 further comprising a plate disposed between said first casing and said second casing, said plate and said second casing each including at least one orifice formed therein for allowing the steam to flow through said plate and said second casing.

8. The extracting device according to claim 6, wherein said second casing includes a first board provided therein for forming a first chamber and a second chamber in said second casing, said first board includes at least one aperture formed therein for communicating said first chamber and said second chamber of said second casing with each other, said at least one duct includes a lower portion engaged into said first chamber of said second casing via said first board and includes an upper portion engaged into said container for allowing the steam in said container to flow into said first chamber of said second casing.

9. The extracting device according to claim 8, wherein said housing includes a cover secured on top thereof and having a coupler provided thereon, and at least one conduit having a lower end engaged into said second chamber of said second casing and having an upper portion coupled to said coupler.

10. The extracting device according to claim 8, wherein said second casing includes a second board secured therein and located below said first board for forming said first chamber between said first and said second boards, said second board includes a cap attached thereto.

11. The extracting device according to claim 1, wherein said box includes a bottom portion having a lid attached thereto.

* * * * *